(12) United States Patent
Santi et al.

(10) Patent No.: US 7,464,449 B2
(45) Date of Patent: Dec. 16, 2008

(54) METHOD OF FORMING A HIGH-STRENGTH SEALED CONNECTION FOR EXPANDABLE TUBULARS

(75) Inventors: Nestor J Santi, Buenos Aires (AR); Gabriel E Carcagno, Buenos Aires (AR)

(73) Assignee: Tenaris Connections AG, Ruggel (LI)

( * ) Notice: Subject to any disclaimer, the term of this patent is extended or adjusted under 35 U.S.C. 154(b) by 42 days.

(21) Appl. No.: 11/546,974

(22) Filed: Oct. 13, 2006

(65) Prior Publication Data

US 2007/0029797 A1 Feb. 8, 2007

Related U.S. Application Data

(62) Division of application No. 10/700,484, filed on Nov. 5, 2003.

(51) Int. Cl.
*B23P 17/00* (2006.01)
*F16L 15/04* (2006.01)
*F16L 15/06* (2006.01)

(52) U.S. Cl. .................. 29/421.1; 29/458; 277/602; 277/608; 285/390

(58) Field of Classification Search ............... 29/421.1, 29/458, 525.13, 527.4; 277/602, 608, 614; 285/390, 915; 403/285
See application file for complete search history.

(56) References Cited

U.S. PATENT DOCUMENTS

| | | | | |
|---|---|---|---|---|
| 2,145,168 A | | 1/1939 | Flagg | 228/135 |
| 3,822,902 A | * | 7/1974 | Maurer et al. | 285/94 |
| 4,121,862 A | | 10/1978 | Greer | 285/333 |
| 4,508,375 A | | 4/1985 | Patterson et al. | 285/334 |
| 4,527,815 A | | 7/1985 | Frick | 285/55 |
| 4,570,982 A | * | 2/1986 | Blose et al. | 285/334 |

(Continued)

FOREIGN PATENT DOCUMENTS

EP   1 106 778 A1   6/2001

(Continued)

OTHER PUBLICATIONS

Offshore Technology Conference 17442; "The Evolution of Solid Expandable Tubular Technology: Lessons Learned Over Five Years"; by T. Grant et al.; Copyright 2005, pp. 1-6; Figs. 1-10 (pp. 7-11).

(Continued)

*Primary Examiner*—Jermie E Cozart
(74) *Attorney, Agent, or Firm*—Fitzpatrick, Cella, Harper & Scinto

(57) ABSTRACT

A radially expandable sealed tubular joint for use in oil and gas wells having a pair of radially expandable tubular elements each having threading at a free end thereof and coupled to one another to form a flush joint connection, the threading including hooked incomplete threads located at least adjacent the free ends, and a sealing substance extending between and adhering to the threading of one element and the threading of the other element, wherein after a radial expansion of the coupled pair of elements the sealing substance remains extended between and adhered to the threading of one element and the threading of the other element. The sealing substance is either a greaseless elastomeric sealant coated on one or both of the pair of elements or a pure metal applied to each of the pair of elements.

10 Claims, 9 Drawing Sheets

U.S. PATENT DOCUMENTS

| | | | | |
|---|---|---|---|---|
| 4,696,499 | A | 9/1987 | Butler | 285/334.4 |
| 4,758,025 | A | 7/1988 | Frick | 285/55 |
| 5,348,095 | A | 9/1994 | Worrall et al. | 166/380 |
| 5,427,418 | A | 6/1995 | Watts | 285/94 |
| 5,582,439 | A | 12/1996 | Spears | 285/333 |
| 5,829,797 | A | 11/1998 | Yamamoto et al. | 285/333 |
| 5,931,511 | A | 8/1999 | Delange et al. | 285/334 |
| 6,409,175 | B1 | 6/2002 | Evans et al. | 277/314 |
| 6,457,532 | B1 | 10/2002 | Simpson | 166/380 |
| 6,543,816 | B1 | 4/2003 | Noel | 285/333 |
| 6,550,821 | B2 | 4/2003 | DeLange et al. | 285/333 |
| 6,554,287 | B1 | 4/2003 | Sivley, IV et al. | 277/616 |
| 6,557,906 | B1 | 5/2003 | Carcagno | 285/333 |
| 6,578,880 | B2 | 6/2003 | Watts | 285/334 |
| 6,604,763 | B1 | 8/2003 | Cook et al. | 285/355 |
| 6,607,220 | B2 | 8/2003 | Sivley, IV | 285/334 |
| 6,712,401 | B2 | 3/2004 | Coulon et al. | 285/331 |
| 7,025,135 | B2 | 4/2006 | Ellington et al. | 166/207 |
| 2002/0130517 | A1 | 9/2002 | Delange et al. | 285/339 |
| 2002/0163192 | A1 | 11/2002 | Coulon et al. | 285/331 |
| 2003/0067166 | A1 | 4/2003 | Sivley, IV | 285/333 |
| 2003/0107217 | A1 | 6/2003 | Daigle et al. | 285/355 |

FOREIGN PATENT DOCUMENTS

| | | | |
|---|---|---|---|
| JP | 05071676 | A * | 3/1993 |
| WO | WO 9118733 | A1 * | 12/1991 |

OTHER PUBLICATIONS

Brazilian Petroleum Institute (IBP 275 00); "Using Expandable Solid Tubulars To Solve Well Construction Challenges In Deep Waters And Maturing Properties"; by M. Bullock et al.; Copyright 2000, pp. 1-14; Figs. 1-3 (p. 3); Figs. 4-5 (p. 6); Figs. 6-8 (p. 7); Figs. 9-10 (p. 9); Figs. 11-12 (p. 12); and Fig. 13 (p. 13).

Specification Data Sheet—"SYNTHACALK™ GC2+ Two-Part Polysulfide Rubber Sealant"; Pecora Corporation (2 pages).

Technical Data—"PSI-270/RC 270 Multi-Component Polyurethane Reservoir Sealant (Self-Leveling and Gun Grade)"; Polymeric Systems, Inc.; Marked as "Form No. 1021-1098" (2 pages).

Product Specifications & Technical Data—"2282 THIOKOL® High Performance Polysulfide Joint Sealant"; PolySpec L.P.; Marked as "Doc. 0707" and "Rev. 06/03"; (2 pages).

API Recommended Practice 5A3, pp. 1-9 (Jul. 1993).

Specification Sheet—"JET-LOK® III High Friction Thread Compound" and "Jet-Lube, Inc. Material Safety Data Sheet"; Jet-Lube, Inc.; Marked as "Date Issued: Mar. 6, 2001"; (2 pages).

Material Safety Data Sheet for SYNTHACALK GC2+ Base (Part B); Date Last Revised: Apr. 2001 (3 pages).

Material Safety Data Sheet for PSI-270GG; MSDS No. 600270700; MSDS Date Mar. 25, 1998 (5 pages).

SPE/IADC 67770—"Solid Expandable Tubular Technology—A Year of Case Histories in the Drilling Environment"; by Kenneth K. Dupal et al.; Copyright 2001 (16 pages).

API Standard 5B—"Specification for Threading, Gauging, and Thread Inspection of Casing, Tubing, and Line Pipe Threads"; Portions submitted are (i) Figure 10, p. 18 (1 page), (ii) Figure 11, p. 21 (1 page), (iii) Figure 12, p. 26 (1 page), (iv) Figure 13, p. 27 (1 page), and (v) Figure 14, p. 28 (1 page).

EPO Application No. 04 769 761.0, Notice of Allowance dated Dec. 13, 2007, pp. 1-42.

* cited by examiner

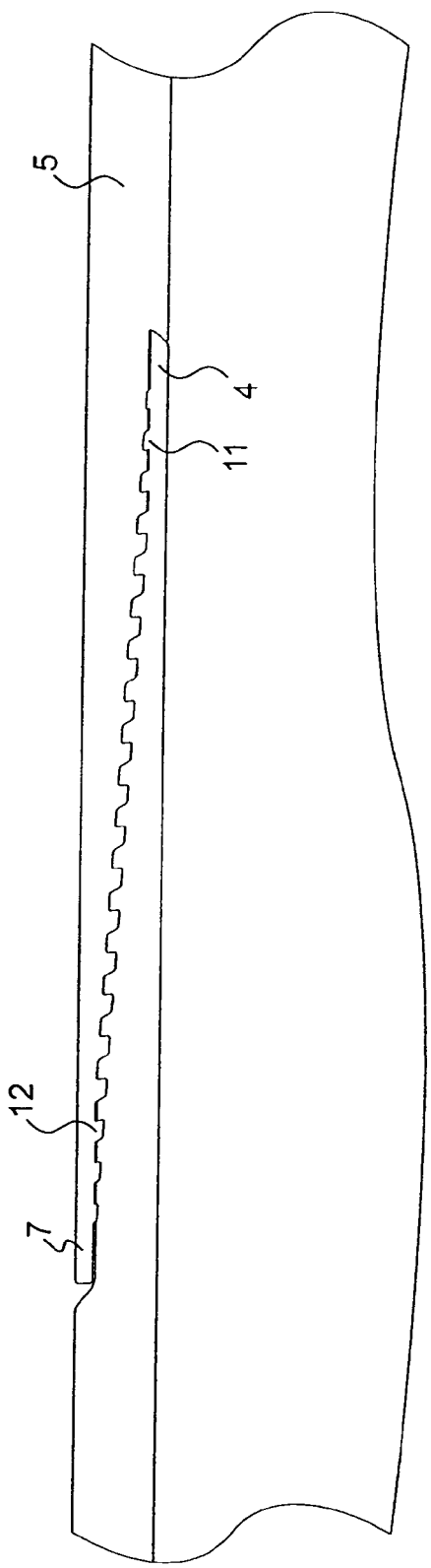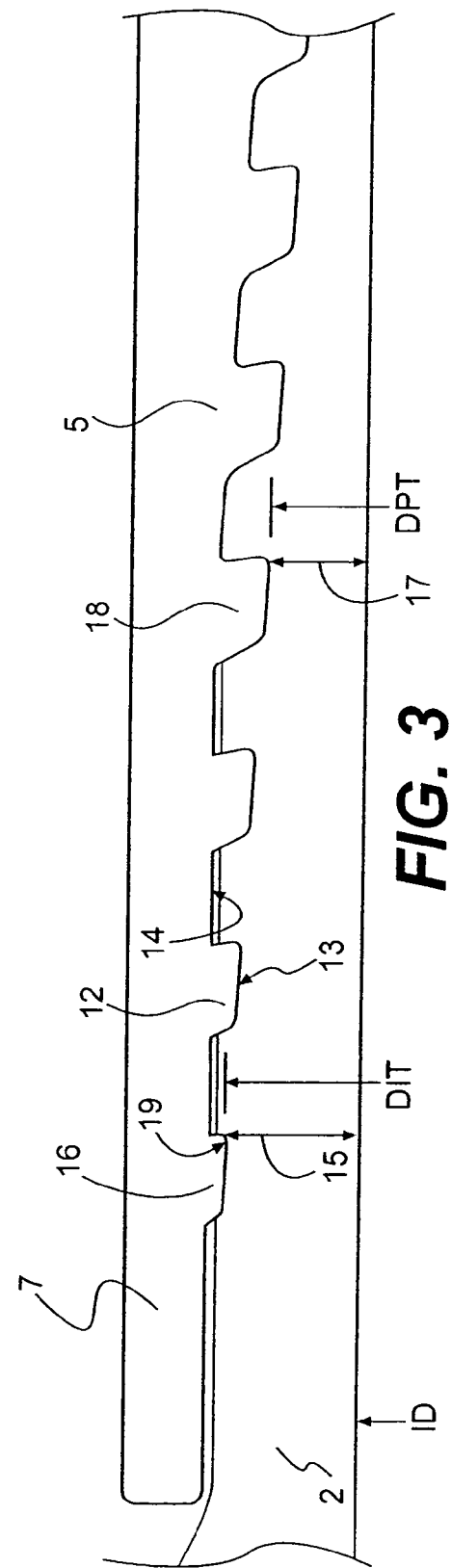

METHOD OF FORMING A HIGH-STRENGTH SEALED CONNECTION FOR EXPANDABLE TUBULARS

This application is a divisional of U.S. patent application Ser. No. 10/700,484 filed Nov. 5, 2003 which is still pending.

BACKGROUND OF THE INVENTION

1. Field of the Invention

The present invention relates to a high-strength connection for expandable members, and more particularly, to a threaded flush joint connection for radially expandable tubulars, such as tubulars used in the oil and gas industry.

2. Description of Related Art

In a typical oil or natural gas well drilling environment, a plurality of tubulars, e.g., pipes, are inserted one at a time into a well bore hole in strings of different diameters, thus forming a telescopic well design. The assembly of such pipes used in the oil and gas industry is commonly performed using threaded joints or connections, the standards for which are described and specified by the American Petroleum Institute ("API"). These connections have limitations when subjected to extreme loading conditions, which are increasingly common in today's oil and gas wells. This is especially true with connections used in a high internal or external gas pressure environment, where the risk of leaks must be eliminated, yet the connections must resist high mechanical loading conditions caused by tension or other loads.

One of the newest and most demanding technologies used in oil and gas well drilling today is "expandable technology." In accordance with this technology, a tubular member, e.g., a pipe, may be radially expanded by means of a mandrel after the pipe has been lowered into a well, which mandrel is moved along the internal diameter of a string of such pipes. Each pipe in the string is enlarged in place to allow other pipes to be lowered and expanded as well, so that ultimately all the pipes in the well have the same internal diameter, thereby avoiding the reduction in internal diameter of the ordinary telescopic well design. Today, such a string of pipes is normally radially expanded by more than five percent, with the industry targeting expansions of greater than twenty percent, based on an internal diameter of the pipe being expanded. One process of expanding tubulars is described in detail in U.S. Pat. No. 5,348,095 to Worrall et al., which is incorporated herein by reference. An alternative expansion method, which utilizes rotary devices, is described in detail in U.S. Pat. No. 6,457,532 to Simpson, which is also incorporated herein by reference. Yet another alternative method of expanding expandable tubulars is described in substantial detail in U.S. Pat. No. 6,604,763 to Cook et al., which is also incorporated herein by reference.

At first, the expandable tubulars or tubular members, e.g., pipes, and the connections to join them were mainly used for casing remediation or similar applications, where the length of the string of pipes was relatively small, thus allowing for low-strength connections. However, with increasing well depths and the consequent increase in the length of the string of pipes, an important design element to be considered is the increased strength of the connection needed. Previous expandable connections, such as the connections in expandable tubular technology utilizing slotted pipes as tubulars, needed only to withstand loads associated with the running and expansion processes. However, as technology for the expansion of solid (i.e., neither slotted nor perforated) tubulars is being spread within the oil and gas industry, another tubular connection design element that should be considered relates to the capability of the connections to assure fluid and/or gas tightness against internal pressure, external pressure, or both.

To provide a high-strength connection between two tubulars, different alternatives have appeared in the oil and gas industry, such as the so-called "upset ends" and "coupling" connections. However, the least problematic radial expansion processes require that the connection and the tubular members have substantially the same wall thicknesses so that the force necessary to deform (i.e., radially expand) the string of pipes is substantially constant as a mandrel, for example, is moved along the pipe string. As such, the connections should preferably be of the type known in at least the oil and gas industry as "flush joint" or "integral flush joint", in which the connections are threaded within the wall thickness of the tubular member, with a male threaded element at one end of the tubular member and a female threaded element on the other end. The external diameter of such a flush joint connection is the same for both tubular members that are to be "made up," or threaded together and torqued, to achieve a desired connection and seal. In these flush joint connections, however, any device (e.g., an O-ring) that is placed within the threads or at the ends of the threaded areas of coupled tubular members diminishes the "critical area", also known as the resistant area. For the female tubular member, this critical area of the connection is the area defined as the circular ring bounded by the external diameter of the connection and the diameter of the thread root of the female member at the last engaged thread of the male member; and for the male tubular member, this critical area is the circular ring bounded by the diameter of the thread root of the male member at the last engaged thread of the female member and the internal diameter of the connection. Therefore, devices placed within the wall thickness, such as O-rings (see, e.g., U.S. Pat. No. 6,409,175 to Evans et al.), will reduce this critical area and consequently the tensile resistance of the threaded connection, which in turn limits the length of the tubular string and the depth that can be achieved therewith as the reduced critical area cannot withstand the required higher loading. As such, a need exists in at least the oil and gas industry for an expandable connection, such as a threaded flush joint connection, having an improved critical area that can withstand today's high loads.

To assure a threaded connection's sealing response, some standard connections in the oil and gas industry rely on metal-to-metal seals placed at various points in the joints depending on the joint design, which points are selected to improve the leak resistance of the connection. This type of seal in a threaded joint provides a barrier to gas or liquid pressure while the threads provide mechanical support and help or even improve stabbing and running characteristics. One example of this type of metal-to-metal seal is the API "Extreme-Line" joint, as defined by API Standard 5B. Several seal design alternatives to metal-to-metal seals have been proposed in the known art. For example, other connections make use of a resilient seal located at a given position along the threaded area, wherein this resilient seal plastically deforms during make up of the connection and the connection obtains sealability as a consequence of the thread gaps being closed by the compression of the resilient material between the mating elements (i.e., within the thread gaps). In another type of connection, small gaps formed between the threads of the mating members of the connection are filled with an API Modified Thread Compound, which is a thread compound that is formulated in accordance with the requirements of obsolete API Bulletin 5A2 (i.e., a grease-based compound). All of these types of sealing mechanisms cannot work properly in an expandable threaded tubular connection after a radial expansion thereof, as there is a tendency for the threads of the female tubular member to shift or separate from the threads of the male tubular member thereby creating leak paths along the connection.

In expandable threaded connections, yet another design aspect that should be considered is the design of the threads. Conventional thread designs for expandable threaded connections have included (i) "perfect threads", as shown for example in FIG. 15A, which are threads having normal (i.e., perfect) roots and normal (i.e., perfect) crests, such as disclosed in U.S. Patent Application Publication No. 2003/0107217A1 to Daigle et al., and (ii) "hooked threads", as shown for example in FIG. 15B, such as disclosed in U.S. Pat. No. 6,409,175 to Evans et al. However, a need remains in the oil and gas industry for an expandable threaded connection having strength greater than that obtained with these conventional forms of threading.

Finally, some connections have been developed for use with expandable tubulars, which are disclosed in varying detail in the following patents and patent applications: U.S. Pat. No. 6,409,175 to Evans et al.; European Publication No. 1106778A1; and U.S. Patent Application Publications No. 2002/0163192A1 to Coulon et al., No. 2003/0067166A1 to Sivley, IV, and No. 2003/0107217A1 to Daigle et al.

However, despite the conventional connections described above for radially expandable tubular members, a need remains in the oil and gas well drilling industry for a high strength, yet simple to manufacture and easily made up, expandable threaded connection that remains sealed after a radial expansion thereof and which can sustain the increasing loads being placed on such connections as a result of today's increasingly deeper, higher pressure wells.

SUMMARY OF THE INVENTION

This invention addresses the foregoing needs in the art by providing, in a preferred embodiment of the present invention, a radially expandable threaded tubular assembly comprising (i) a radially expandable male threaded element having external male threading and a first free end, the external male threading including a first incomplete thread and a first hooked thread, the first incomplete thread being located at least adjacent the first free end of the male threaded element; (ii) a radially expandable female threaded element having internal female threading and a second free end, the internal female threading including a second incomplete thread and a second hooked thread, the second incomplete thread being located at least adjacent the second free end of the female threaded element, the female threaded element being threadedly engaged with the male threaded element; and (iii) an elastomeric sealant extending between the external male threading and the internal female threading and adhering to both the external male threading and the internal female threading. The elastomeric sealant is capable of being elongated after curing while remaining extended between and adhered to the external male threading and the internal female threading.

In another aspect of a preferred embodiment of the present invention, the elastomeric sealant is capable of being elongated at least about 45 percent after curing while remaining extended between and adhered to each of the external male threading and the internal female threading and has an elastic modulus less than about 2.0 MPa (290 p.s.i.). More preferably, the elastomeric sealant is capable of being elongated at least about 100 percent after curing while remaining extended between and adhered to each of the external male threading and the internal female threading and has an elastic modulus less than about 1.0 MPa (145 p.s.i.). Even more preferably, the elastomeric sealant is capable of being elongated at least about 400 percent after curing while remaining extended between and adhered to each of the external male threading and the internal female threading and has an elastic modulus between about 0.5 MPa (73 p.s.i.) and about 2.0 MPa (290 p.s.i.).

In yet another aspect of a preferred embodiment of the present invention, the elastomeric sealant is adhered to each of the external male threading and the internal female threading with an adhesion-to-rigid-substrate of at least 0.35 MPa (51 p.s.i.), and more preferably with an adhesion-to-rigid-substrate of at least 0.7 MPa (102 p.s.i.). Additionally, the elastomeric sealant is preferably a greaseless elastomeric sealant, which is preferably capable of curing in the absence of oxygen and in the absence of humidity.

In yet another aspect of a preferred embodiment of the present invention, the greaseless elastomeric sealant is a polysulfide sealant or a polyurethane sealant, which is preferably a viscous paste or a liquid before curing and is a rubber-like solid after curing. Moreover, the male threaded element and the female threaded element most preferably threadedly engage each other to form a flush joint connection.

In yet another aspect of a preferred embodiment of the present invention, each of the first incomplete thread and the second incomplete thread has a perfect crest and an imperfect root. Also, each of the first incomplete thread and the second incomplete thread is most preferably a hooked thread, the first incomplete thread is preferably the initial thread adjacent the first free end of the male threaded element, and the second incomplete thread is preferably the initial thread adjacent the second free end of the female threaded element. Furthermore, in yet another aspect of a preferred embodiment of the present invention, at least one of the male threaded element and the female threaded element includes a torque shoulder, and most preferably a reverse torque shoulder.

In another preferred embodiment of the present invention, a radially expandable threaded tubular assembly comprises (i) a radially expandable male threaded element having external male threading and a first free end, the external male threading including a first incomplete thread and a first hooked thread, the first incomplete thread being located at least adjacent the first free end of the male threaded element; (ii) a radially expandable female threaded element having internal female threading and a second free end, the internal female threading including a second incomplete thread and a second hooked thread, the second incomplete thread being located at least adjacent the second free end of the female threaded element; (iii) a first metallic coating disposed on and adhered to the external male threading; and (iv) a second metallic coating disposed on and adhered to the internal female threading. The female threaded element is threadedly engaged with the male threaded element and the first metallic coating is cold welded to the second metallic coating.

In another aspect of a preferred embodiment of the present invention, each of the first metallic coating and the second metallic coating is a ductile metal and has a yielding tension less than about 100 MPa (14.5 k.s.i.), more preferably a yielding tension less than about 50 MPa (7.25 k.s.i.), and most preferably a yielding tension less than about 20 MPa (2.9 k.s.i.). In addition, each of the first metallic coating and the second metallic coating preferably allows a principal shear strain of at least about 100 percent without fracturing and without fissure propagation.

In yet another aspect of a preferred embodiment of the present invention, one of the first metallic coating and the second metallic coating is an alloy, and the other of the first metallic coating and the second metallic coating is an alloy or a pure metal. Preferably, each of the first metallic coating and the second metallic coating is a pure metal, and even more preferably, the pure metal contains 99.99 percent by weight of a single metal. Moreover, in yet another aspect of a preferred embodiment of the present invention, the single metal is selected from the group consisting of Copper, Aluminum, Lead, Zinc, Tin and Magnesium, and most preferably is selected from the group consisting of Lead, Zinc and Tin.

In yet another aspect of a preferred embodiment of the present invention, each of the first metallic coating and the second metallic coating has a thickness at least about one-sixteenth of a gap between the engaged internal female threading and the external male threading. In addition, each of the first metallic coating and the second metallic coating preferably has substantially the same thickness and is of the same pure metal.

In yet another preferred embodiment of the present invention, a method of forming a sealed tubular joint includes the steps of (i) providing a first radially expandable tubular member having external male threading and a first free end, the external male threading including a first incomplete thread and a first hooked thread, the first incomplete thread being located at least adjacent the first free end of the first tubular member; (ii) providing a second radially expandable tubular member having internal female threading and a second free end, the internal female threading including a second incomplete thread and a second hooked thread, the second incomplete thread being located at least adjacent the second free end of the second tubular member; (iii) coating at least one of the external male threading and the internal female threading with an elastomeric sealant; (iv) coupling the first tubular member and the second tubular member, the coupling thereby providing a threaded connection; (v) disposing the elastomeric sealant between the external male threading and the internal female threading and into adherence with each of the external male threading and the internal female threading; (vi) curing the elastomeric sealant, the curing thereby providing a cured elastomeric sealant extended between and adhered to the external male threading and the internal female threading; and (vii) radially expanding the threaded connection. In this preferred embodiment, the cured elastomeric sealant is capable of being elongated while remaining extended between and adhered to the external male threading and the internal female threading.

In another aspect of a preferred embodiment of the present invention, the threaded connection is radially expanded at least about five percent based on an inside diameter of the threaded connection. More preferably, the threaded connection is radially expanded at least about fifteen percent based on an inside diameter of the threaded connection.

In another aspect of a preferred embodiment of the present invention, the elastomeric sealant is a greaseless elastomeric sealant, each of the external male threading and the internal female threading is coated with the greaseless elastomeric sealant in the coating step, and the cured elastomeric sealant (i) is capable of being elongated at least about 400 percent while remaining extended between and adhered to the external male threading and the internal female threading, (ii) is adhered to each of the external male threading and the internal female threading with an adhesion-to-rigid-substrate of at least 0.7 MPa (102 p.s.i.); and (iii) has an elastic modulus between about 0.5 MPa (73 p.s.i.) and about 2.0 MPa (290 p.s.i.).

In yet another preferred embodiment of the present invention, a method of forming a sealed tubular joint includes the steps of (i) providing a first radially expandable tubular member having external male threading and a first free end, the external male threading including a first incomplete thread and a first hooked thread, the first incomplete thread being located at least adjacent the first free end of the first tubular member; (ii) providing a second radially expandable tubular member having internal female threading and a second free end, the internal female threading including a second incomplete thread and a second hooked thread, the second incomplete thread being located at least adjacent the second free end of the second tubular member; (iii) coating the external male threading with a first metallic coating, the first metallic coating being a first pure metal and adhering to the external male threading; (iv) coating the internal female threading with a second metallic coating, the second metallic coating being a second pure metal and adhering to the internal female threading; (v) coupling the first tubular member and the second tubular member, the coupling thereby providing a threaded connection, the coupling cold welding the first metallic coating together with the second metallic coating; and (vi) radially expanding the threaded connection. After the radial expansion of the threaded connection (i) the first metallic coating remains adhered to the external male threading, (ii) the second metallic coating remains adhered to the internal female threading, and (iii) the first metallic coating and the second metallic coating remain cold welded together.

In yet another preferred embodiment of the present invention, an expandable sealed tubular joint comprises a pair of radially expandable elements each having threading at a free end thereof and coupled to one another, the threading including hooked incomplete threads being located at least adjacent the free ends; and a sealing substance extending between and adhering to the threading of one radially expandable element and the threading of the other radially expandable element, wherein after a radial expansion of the coupled pair of radially expandable elements the sealing substance remains extended between and adhered to the threading of one radially expandable element and the threading of the other radially expandable element.

In another aspect of a preferred embodiment of the present invention, the sealing substance is a greaseless elastomeric sealant that (i) is capable of being elongated at least about 100 percent while remaining extended between and adhered to the threading of one radially expandable element and the threading of the other radially expandable element, (ii) is adhered to the threading with an adhesion-to-rigid-substrate of at least 0.35 MPa (51 p.s.i.); and (iii) has an elastic modulus between about 0.5 MPa (73 p.s.i.) and about 2.0 MPa (290 p.s.i.).

In yet another aspect of a preferred embodiment of the present invention, the sealing substance is a pure metal containing 99.99 percent by weight of a single metal selected from the group consisting of Copper, Aluminum, Lead, Zinc, Tin and Magnesium, the coupled pair of radially expandable elements form a flush joint connection, and the hooked incomplete threads have perfect crests and imperfect roots.

BRIEF DESCRIPTION OF THE DRAWINGS

FIG. 2 is a partial cross-sectional view of a threaded connection of a preferred embodiment showing a coupled pin and box.

FIG. 3 is an enlarged detailed view showing hooked incomplete threads of a box where the incomplete threads have normal crests and imperfect roots.

FIG. 15A shows non-hooked perfect threads, and FIG. 15B shows hooked perfect threads.

DETAILED DESCRIPTION OF THE PREFERRED EMBODIMENTS

Figure 1:
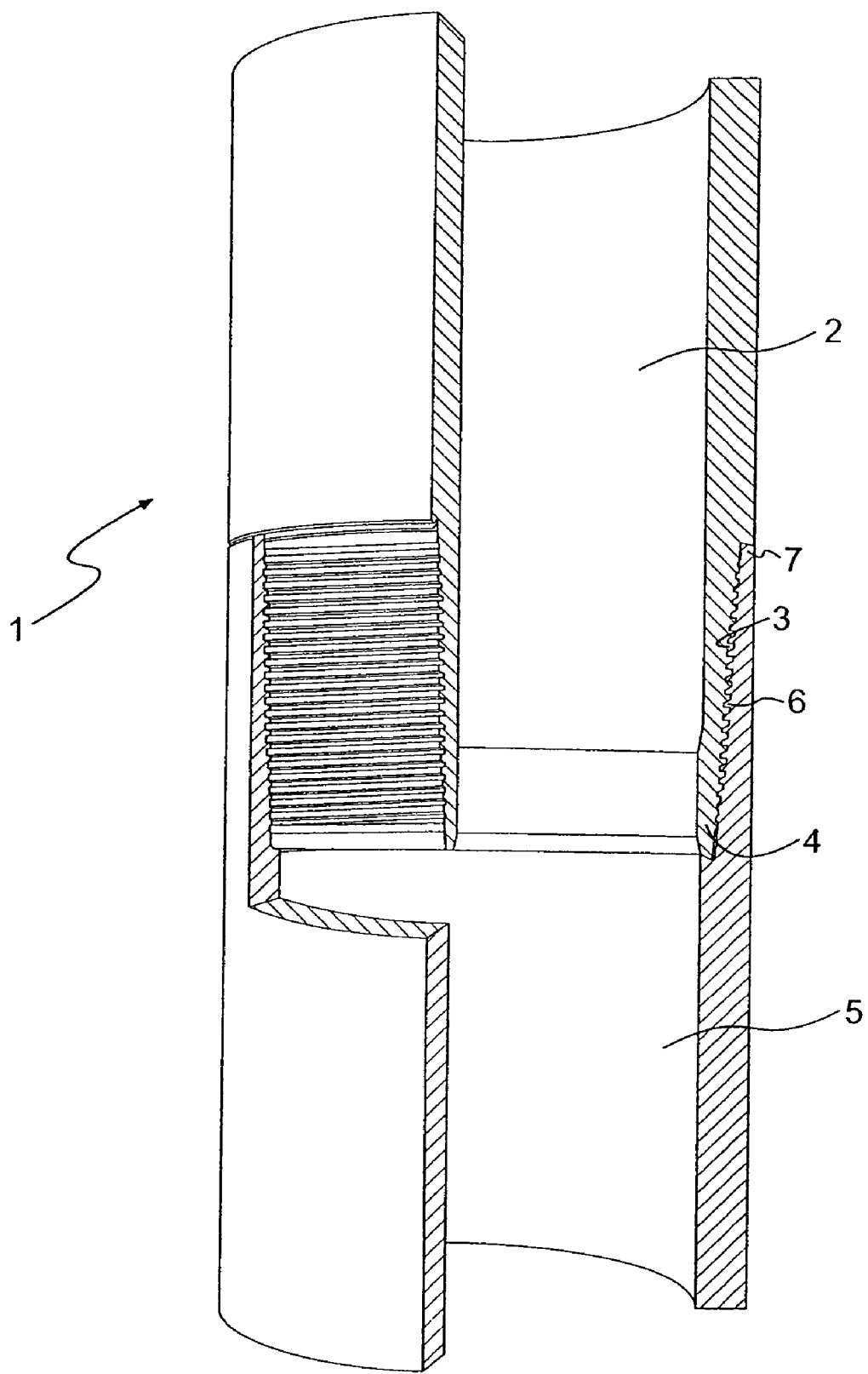
FIG. 1 is a partial sectional view of a radially expandable, threaded, tubular, flush joint connection representing one embodiment of the present invention.

FIG. 1 generally shows a radially expandable threaded tubular assembly, which is an embodiment of the present invention. The tubular assembly 1 generally comprises a radially expandable male threaded element 2 having external male threading 3 and a first free end 4, a radially expandable female threaded element 5 having internal female threading 6 and a second free end 7 (hereinafter, the external male threading 3 and the internal female threading 6 are also collectively referred to as the "threading" of the threaded elements 2 and 5), and a sealing substance 8, 8' (see, e.g., FIGS. 5 and 6) extending between and adhering to the threading (e.g., 3) of one radially expandable element (e.g., 2) and the threading (e.g., 6) of the other radially expandable element (e.g., 5). The male and female threaded elements 2, 5 may be, for example, radially expandable tubing, casing, or other solid expandable tubular, commonly known collectively within at least the oil and gas well drilling field as oilfield tubular goods and which are included within the scope of the terms "tubular(s)", "tubular member(s)", and "element(s)" as used hereinafter. Similarly, in at least the oil and gas well drilling field, the male threaded element 2 is commonly referred to as a "pin" or "pin member" and the female threaded element 5 is commonly referred to as a "box" or "box member". As such, the terms "pin 2" and "box 5" are used interchangeably hereinafter to refer to the male threaded element 2 and the female threaded element 5 respectively.

The pin 2 and box 5 are coupled together by threading the pin 2 into the box 5 and applying a desired, and usually predetermined, amount of torque. This coupling or engaging together of the pin 2 and the box 5 results in a tubular assembly 1, hereinafter referred to as a "joint", "connection", or "threaded connection". The pin 2 and the box 5 are properly threadedly engaged or "made up" when, for example, such a predetermined amount of torque is applied to the connection and a pin nose 9 (see, e.g., FIG. 14) of the pin 2 is in contact with an internal torque shoulder 30 (described below) of the box 5. The threaded connection of the pin 2 and the box 5 preferably form a flush joint connection, as shown in FIG. 1. In the oil and gas well drilling field, such a flush joint or flush joint connection is, for example, a connection with male and female threads cut directly into lengths of pipe so as to provide the same, or substantially the same, inner diameter and outer diameter throughout the connection as in the middle of the length of pipe once those lengths are joined, coupled, or connected together. In conventional oil and gas wells, the box 5 is installed facing out of the well, and the pin 2 is installed facing down into the well, as shown in FIG. 1. However, the present invention is also applicable to other connection configurations, such as the pin 2 facing out of a well with the box 5 facing down into the well, and also to a flush joint connection where the male threaded element 2 of each of two pipes are coupled together by a connector (e.g., a relatively short section of pipe) having two female threaded elements 5, and vice versa (not shown).

The details of the threading of the tubular assembly 1 will now be described with reference to at least FIGS. 2 through 6. In a preferred embodiment, both of the external male threading 3 and the internal female threading 6 preferably include hooked threads and incomplete threads. In thread design, the term "incomplete threads" is used interchangeably with "imperfect threads". More preferably, the threads of the pin 2 and the box 5 include hooked incomplete threads (i.e., the threads include incomplete threads that are also hooked). Additional details of these hooked, incomplete, and hooked incomplete threads are discussed below with respect to preferred embodiments of the present invention.

Figure 14:
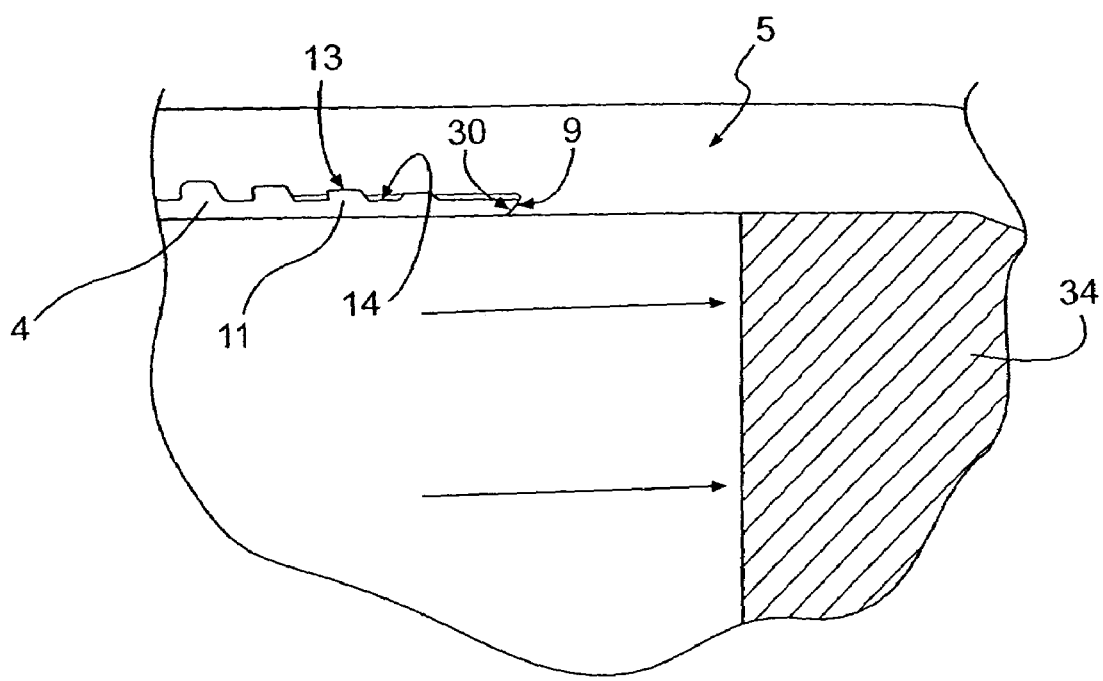
FIG. 14 is an enlarged detailed view showing a pin nose of a pin engaged with a reverse torque shoulder of a box, wherein that pin nose has not deformed towards the inside of the threaded connection between the pin and the box as a consequence of a spring-back movement.
Figure 15A:
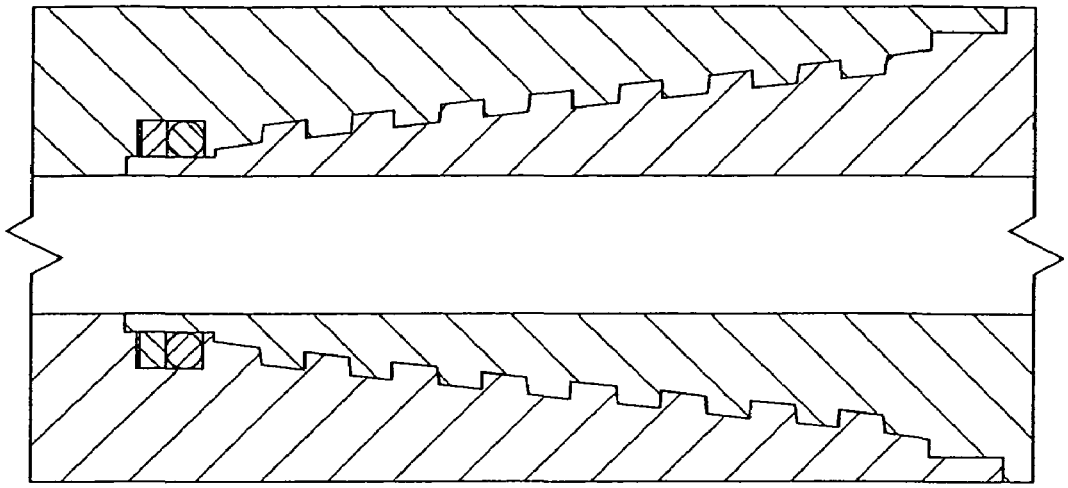
FIGS. 15A and 15B each show prior art threads, where
Figure 15B:
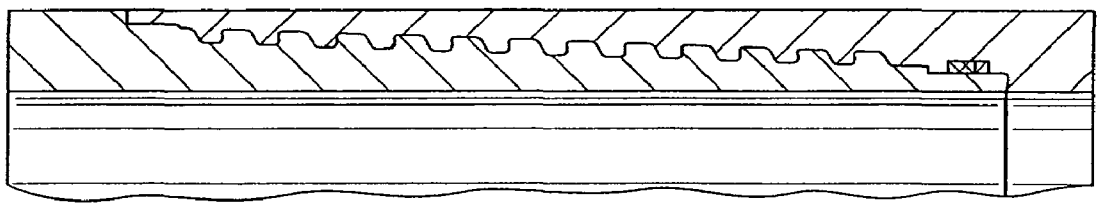

As shown in FIGS. 2, 3, and 14, each of the pin 2 and the box 5 includes threads having incomplete or imperfect thread(s) 11, 12. Of note, the terms "thread", "threads", and "threading" are used interchangeably herein, as it is to be understood, for example, that a "thread" or "threading" may include a plurality of "threads", and likewise "threads" may comprise "threading" or a "thread". The incomplete threads 11 of the pin 2 and the incomplete threads 12 of the box 5 each include "normal" or "perfect" crests 13 and imperfect roots 14. The normal or perfect crests 13 of the incomplete threads 11 maintain the same, or substantially the same, taper as the rest of the crests of the threads of the external male threading 3; and the perfect crests 13 of the imperfect threads 12 maintain the same, or substantially the same, taper as the rest of the crests of the threads of the internal female threading 6. However, unlike the perfect crests 13, the roots 14 of the incomplete threads 11, 12 do not have the same taper as the roots of the rest of the threads of the pin 2 and the box 5, respectively, which is why these roots are deemed "imperfect" roots. Incomplete threads having normal crests and imperfect roots are used, for example, in API "extreme line" piping, and such incomplete threads are defined, for example, by American Petroleum Institute (API) Standard 5B.

Furthermore, the incomplete threads 11 of the pin 2 are located at least close to or adjacent the free end 4 of the pin 2, and the incomplete threads 12 of the box 5 are located at least close to or adjacent the free end 7 of the box 5, as shown, for example, in FIG. 2. Preferably, the initial thread (i.e., the first or the starting thread) of each of the pin 2 and the box 5 is an incomplete thread. More preferably, the incomplete threads 11, 12 constitute at least one tenth (1/10th) of the length of the total length of the threads of the pin 2 and the box 5, respectively, starting from the free ends 4, 7.

Additional details of the preferred incomplete threads 11, 12 of the present invention are provided below with reference to FIG. 3. FIG. 3 shows a detailed view of the free end 7 of the box 5 threadedly engaged or made up with the pin 2. As shown, the box 5 includes incomplete threads 12 formed by imperfect roots 14 and perfect crests 13. In threading design, "perfect" roots are fully formed roots (i.e., roots cut to a full depth consistent with the depth of roots of adjacent threads), while "imperfect" roots are roots that are cut to less than full depth. With incomplete threads formed at the free end 7 of the box 5, a preferred resistant area or preferred critical area 15 is defined in the pin 2 adjacent the last engaged thread 16 of the box 5, which preferred critical area 15 equals the Diameter of Imperfect Threads (labeled as DIT in FIG. 3), which in this case is the diameter of the thread root 19 adjacent the last engaged thread crest of the box 5, minus the Inside Diameter (labeled as ID) of pin 2. In other words, this preferred critical area 15 is defined by the minimum wall thickness of the pin 2 at the location directly opposing the last engaged thread 16 of the box 5. However, if there were no imperfect threads formed at the free end 7 of the box 5, then a normal critical area 17 would be defined in the pin 2 adjacent the last engaged "full" or "perfect" thread 18 of the box 5, which normal critical area 17 equals the Diameter of Perfect Threads (labeled as DPT) minus the Inside Diameter (ID) of pin 2. As such, the preferred critical area 15 is larger than the normal critical area 17, thus enabling the joint to withstand higher loads (e.g., higher axial loading). As explained above, the preferred and normal critical areas 15, 17 of the pin 2 derive from the imperfect threads 12 of the box 5. Likewise, the preferred and normal critical areas of the box 5 derive from the imperfect threads 11 of the pin 2.

Figure 4:
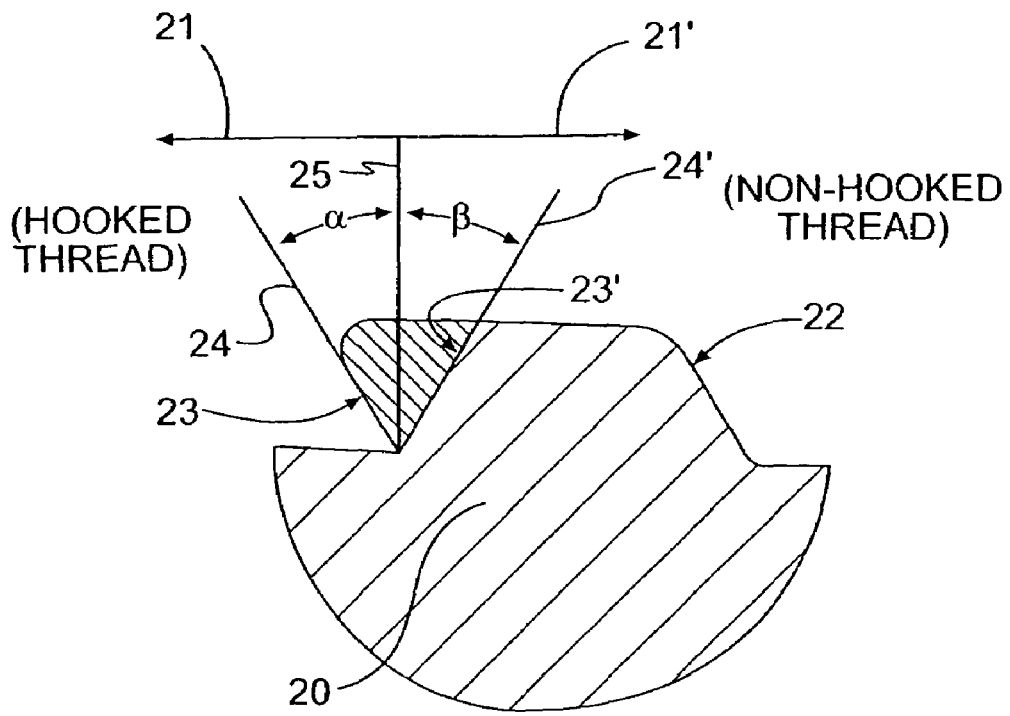
FIG. 4 is a detailed view of a thread design, which view juxtaposes a hooked thread design with a non-hooked thread design for purposes of illustration.

Also as shown in FIGS. 2, 3, 4, and 14, each of the pin 2 and the box 5 preferably includes threads having a "hooked" thread design. This hooked thread design is explained below with reference to FIG. 4, which is a partial detailed view of a sample thread 20 on, for example, a pin, similar to the thread profile shown in FIG. 5. In FIG. 4, a hooked thread profile is juxtaposed with a non-hooked thread profile to illustrate the differences between the two thread forms. Load flank position arrows 21, 21' indicate the possible positions of a load flank 23, 23' of the sample thread 20. If an axis 24 of the load flank 23 forms an angle α (alpha) with a line 25 that is perpendicular to the tubular member (e.g., pipe) longitudinal axis (not shown), then the thread profile is a "hooked thread" or "hooked thread profile." In contrast, if the axis 24' of the load flank 23' forms an angle β (beta) with the line 25, then the thread profile is a "non-hooked thread profile." The sample thread 20, whether on a pin or a box, also has a stabbing flank 22. The stabbing flank 22 of each of the box and the pin face each other, so if one of them (e.g., the stabbing flank of the pin) points into a well, then the other one (e.g., the stabbing flank of the box) faces to the opposite direction (i.e., out of the well).

In a preferred embodiment of the present invention, each of the external male threading 3 and the internal female threading 6 includes hooked threads. Most preferably, all of the threading of the pin 2 and box 5 is hooked threading, including the incomplete threads. In other words, the threading of the pin 2 and the box 5, including the incomplete threads, is most preferably hooked, as shown, for example, in FIG. 5, where load flank 26 is shown having an angle α (alpha) greater than zero, in accordance with the "hooked thread" discussion above with reference to FIG. 4.

Figure 8:
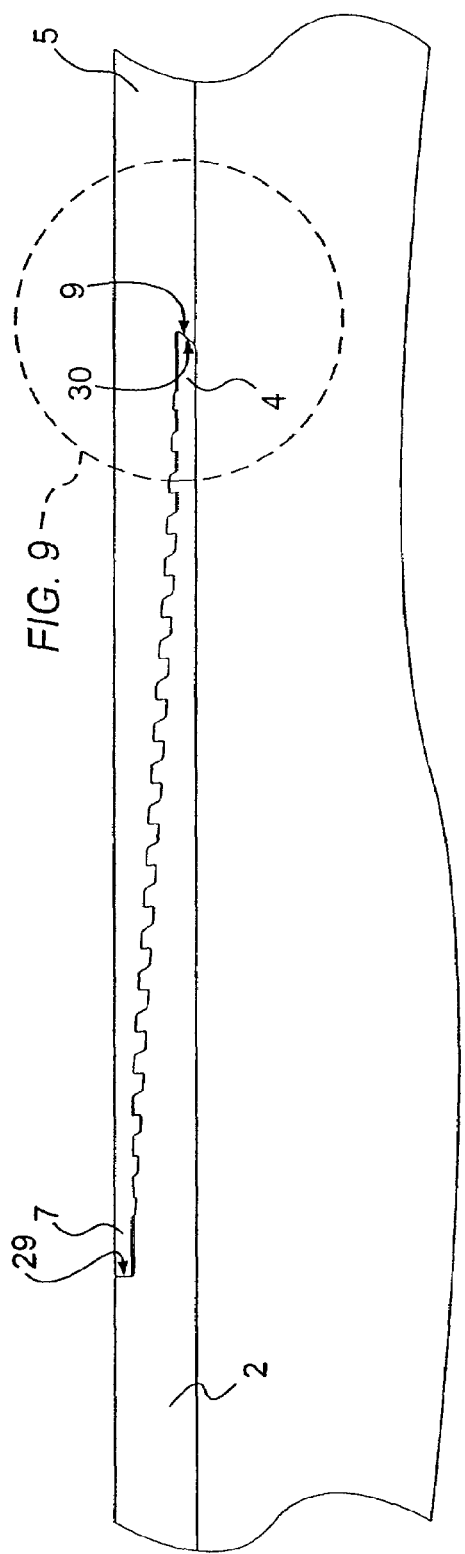
FIG. 8 is a partial cross-sectional view showing a threaded connection between a pin and a box where the pin includes an external torque shoulder.
Figure 9:
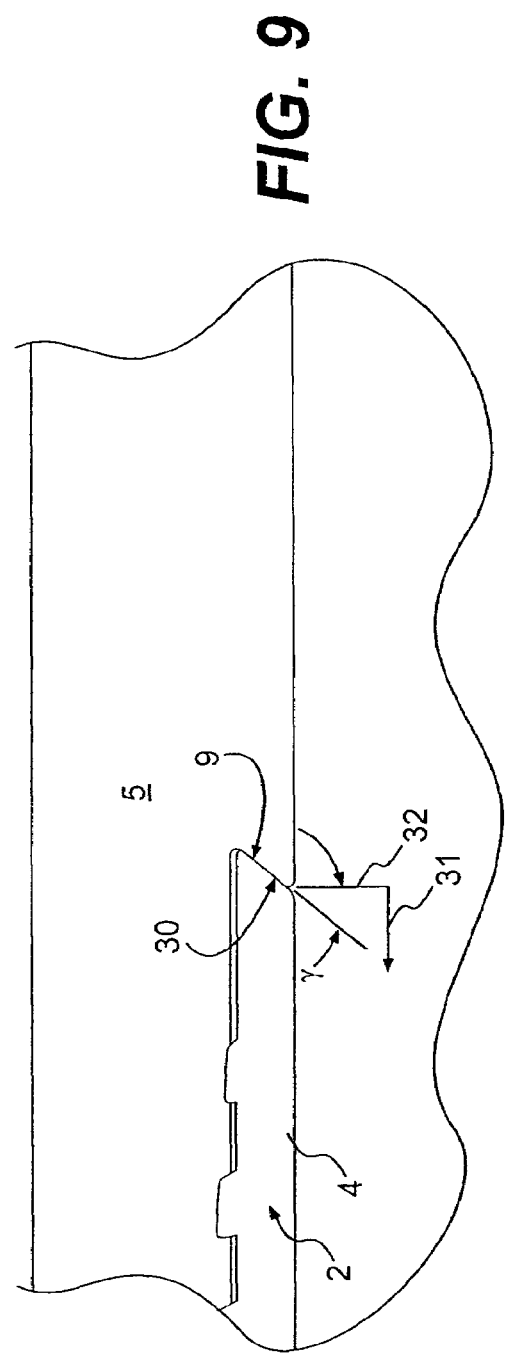
FIG. 9 is a detailed view of a portion of FIG. 8, and shows a cross-sectional view of an internal torque shoulder.

In another aspect of the preferred embodiment, at least one of the pin 2 and the box 5 includes a torque shoulder. As shown in FIG. 8, the pin 2 preferably includes an external torque shoulder 29, which is formed at a location so as to receive the free end 7 of the box 5. As shown in FIG. 9, the box 5 preferably includes an internal torque shoulder 30, which is formed at a location so as to receive the free end 4 of the pin 2. The internal torque shoulder 30 preferably is a reverse torque shoulder (30), that is, the internal torque shoulder 30 preferably has a negative angle, which by hooking the pin nose 9 further prevents the pin nose 9 from deforming toward the inside of the threaded connection. In FIG. 9, the angle of the face of the reverse torque shoulder 30 is shown as negative torque shoulder angle γ (gamma). Angle γ (gamma) is measured between a line 32 that is perpendicular to the tubular member (e.g., pipe) longitudinal axis (not shown) and the face of the reverse torque shoulder 30. An arrow 31 indicates the direction towards which the face of the reverse torque shoulder 30 is able to move to be considered a "negative" or "reverse torque shoulder." In addition, the pin nose 9 of the pin 2, which contacts the reverse torque shoulder 30, preferably has a correspondingly angled face that is substantially parallel to the face of the reverse torque shoulder 30. As such, the pin nose 9 and the reverse torque shoulder 30 engage each other (e.g., mate like pieces of a puzzle) to prevent the first free end 4 of the pin 2 from curling or moving inward towards the center of the tubular assembly after the tubular assembly has been expanded.

The sealing substance 8, 8' extending between and adhering to the threading (e.g., 3) of one radially expandable element (e.g., 2) and the threading (e.g., 6) of the other radially expandable element (e.g., 5) is described below. The sealing substance 8, 8' may be either (i) an elastomeric sealant or (ii) a metallic coating, each of which is individually discussed in greater detail below.

Figure 5:
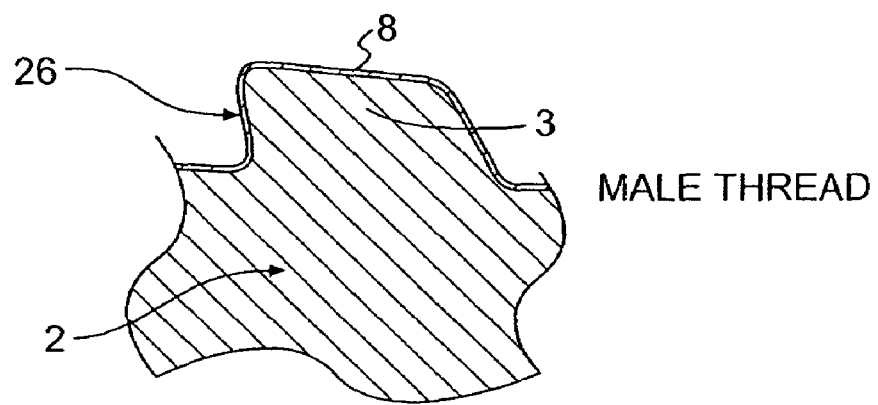
FIG. 5 is a detailed view showing external male threading of a male threaded element coated with a sealing substance.
Figure 6:
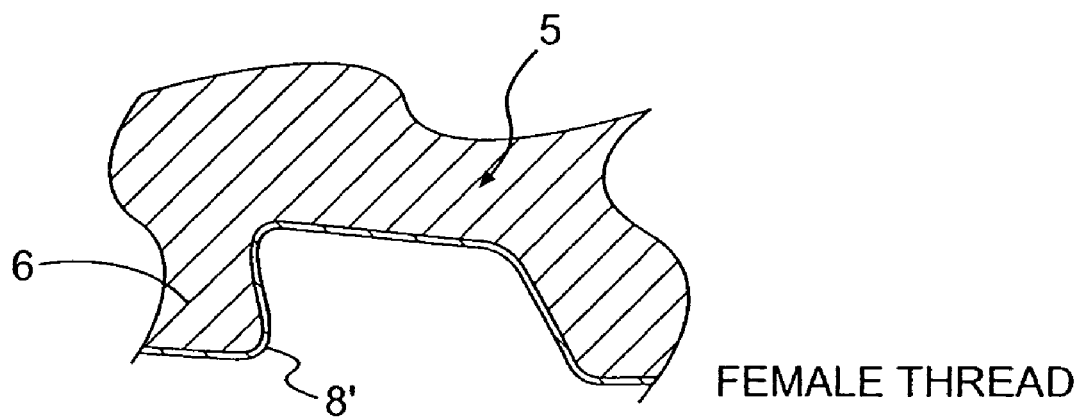
FIG. 6 is a detailed view showing internal female threading of a female threaded element coated with a sealing substance.

Elastomeric Sealant. As shown in FIGS. 5 and 6, where the sealing substance 8, 8' is an elastomeric sealant, at least a portion of the threads of the pin 2 or at least a portion of the threads of the box 5 is coated with that elastomeric sealant. Preferably, substantially all of the threads of both of the pin 2 and the box 5 are coated with the elastomeric sealant (see 8, 8'); however, the threads may also be coated in a differential way along the threading to provide localized sealing points. The elastomeric sealant (see 8, 8') is applied to the threads of the pin 2 and the box 5 before coupling thereof. The elastomeric sealant (see 8, 8') is applied in an amount and thickness such that when the pin 2 and the box 5 are coupled, thus forming a threaded connection, the elastomeric sealant (see 8, 8') extends between the external male threading 3 and the internal female threading 6 and adheres to both the external male threading 3 and the internal female threading 6. The elastomeric sealant (see 8, 8') is preferably a curable sealant, and is capable of being elongated after curing while remaining extended between and adhered to the external male threading 3 and the internal female threading 6.

In a preferred embodiment of the present invention, the elastomeric sealant (see 8, 8') is capable of being elongated at least about 45 percent after curing while remaining extended between and adhered to each of the external male threading 3 and the internal female threading 6 and has an elastic modulus less than about 2.0 MPa (290 p.s.i.). More preferably, the elastomeric sealant (see 8, 8') is capable of being elongated at least about 100 percent after curing while remaining extended between and adhered to each of the external male threading 3 and the internal female threading 6 and has an elastic modulus less than about 1.0 MPa (145 p.s.i.). Most preferably, the elastomeric sealant (see 8, 8') is capable of being elongated at least about 400 percent after curing while remaining extended between and adhered to each of the external male threading 3 and the internal female threading 6 and has elastic modulus between about 0.5 MPa (73 p.s.i.) and about 2.0 MPa (290 p.s.i.).

The elastomeric sealant (see 8, 8') is also preferably a "greaseless" elastomeric sealant. In other words, the preferred elastomeric sealant (see 8, 8') of the present invention has no grease base or component; thus, the main performance objectives of the preferred elastomeric sealant (see 8, 8') are bonding (ability to adhere), elongation, and sealing, and not lubrication. To illustrate, the reference standard for API Modified Thread Compound, which is a thread compound that is formulated in accordance with the requirements of obsolete API Bulletin 5A2, requires a grease base of about 36 percent by weight. Further, API Recommended Practice (RP) 5A3 sets forth that a primary purpose of the API Modified Thread Compound is to act as a lubricating material between mating connectors of a threaded connection. Because API Modified Thread Compound contains such a grease base, the API Modified Thread Compound does not qualify as an elastomeric sealant (see 8, 8') of the present invention.

Furthermore, in another aspect of a preferred embodiment of the present invention, the elastomeric sealant (see 8, 8') adheres to each of the external male threading 3 and the internal female threading 6 with an adhesion-to-rigid-substrate of at least 0.35 MPa (51 p.s.i.). This adhesion-to-rigid-substrate is measured in accordance with ASTM D429-02a (Method A), which is known as the "Standard Test Methods for Rubber Property—Adhesion to Rigid Substrates." More preferably, the elastomeric sealant (see 8, 8') adheres to each of the external male threading 3 and the internal female threading 6 with an adhesion-to-rigid-substrate of at least 0.5 MPa (73 p.s.i.). Most preferably, the elastomeric sealant (see 8, 8') adheres to each of the external male threading 3 and the internal female threading 6 with an adhesion-to-rigid-substrate of at least 0.7 MPa (102 p.s.i.). Moreover, the preferred elastomeric sealant (see 8, 8') is capable of curing in the absence of oxygen and in the absence of humidity, and preferably in the absence of both oxygen and humidity. The preferred elastomeric sealant (see 8, 8') is also a viscous paste or a liquid before curing and is a rubber-like solid after fully curing. The preferred elastomeric sealant (see 8, 8') preferably fully cures within two days, and more preferably fully cures in about one day or less.

In a most preferred embodiment, the elastomeric sealant (see 8, 8') of the present invention is a greaseless polysulfide sealant or a greaseless polyurethane sealant. Examples of such most preferred elastomeric sealants (see 8, 8'), by way of non-limiting example, include the following commercially available sealants: (i) THIOKOL (Registered Trademark) 2282 High Performance Polysulfide Joint Sealant, available from PolySpec L.P., located at 6614 Gant Road, Houston, Tex., which sealant has a published elongation property of about 450 to 500 percent, fully cures in about one day, and has no grease base or component; (ii) PSI-270/RC 270 Multi-Component Polyurethane Reservoir Sealant, available from Polymeric Systems, Inc., located at 723 Wheatland Street, Pheonixville, Pa., which sealant has a published elongation property of 450 to 550 percent as measured in accordance with ASTM D 412, fully cures at 75° F. (24° C.) in about 2 days, has a published adhesion-in-peel of 20 to 25 lb/in (3.5 kN/m to 4.4 kN/m) in accordance with ASTM C 794, which is known as the "Standard Test Method for Adhesion-in-Peel of Elastomeric Joint Sealant", and has no grease base or component; and (iii) SYNTHACALK (Trademark) GC2+ Two-Part Polysulfide Rubber Sealant, available from Pecora Corporation, located at 165 Wambold Road, Harleysville, Pa., which sealant has a published elongation property of 500 to 550 percent as measured in accordance with ASTM D 412, fully cures in about one day, and has no grease base or component.

Metallic Coating. As also shown in FIGS. 5 and 6, where in an alternative embodiment the sealing substance 8, 8' is a metallic coating, both at least a portion of the threads of the pin 2 and at least a portion of the threads of the box 5 are coated with a metallic coating (see 8, 8'). Preferably, substantially all of the threads of both of the pin 2 and the box 5 are coated with either the same or different metallic coating (see 8, 8'); however, the threads may also be coated in a differential way along the threading to provide localized sealing points. The metallic coating (see 8, 8') is applied to the threads of the pin 2 and the box 5 before coupling thereof.

More specifically, where the sealing substance 8, 8' is a metallic coating, a first metallic coating (see 8) is disposed on and adhered to the external male threading 3, and a second metallic coating (see 8') is disposed on and adhered to the internal female threading 6. Preferably, each of the first metallic coating (see 8) and the second metallic coating (see 8') is a ductile metal with a low yield point, having, for example, a yielding tension less than about 100 MPa (14.5 k.s.i.). More preferably, each of the first metallic coating (see 8) and the second metallic coating (see 8') is a ductile metal and has a yielding tension less than about 50 MPa (7.25 k.s.i.). Most preferably, each of the first metallic coating (see 8) and the second metallic coating (see 8') is a ductile metal and has a yielding tension less than about 20 MPa (2.9 k.s.i.). In addition, each of the preferred first metallic coating (see 8) and the preferred second metallic coating (see 8') allows a principal shear strain of at least about 100 percent without fracturing and without fissure propagation.

In one aspect of the present invention, each of the first metallic coating (see 8) and the second metallic coating (see 8') is a pure metal. "Pure metal", as that term is used herein, is intended to have its ordinary meaning as that term is used in the metals art. Nonetheless, in a more preferred embodiment, the pure metal contains 99.99 percent by weight of a single metal. This single metal is a metal such as, for example, Copper, Aluminum, Lead, Zinc, Tin and Magnesium. More preferably, the single metal is selected from the group consisting of Lead, Zinc and Tin. As initially applied to the threads of the pin 2 and the box 5 (i.e., before coupling thereof), each of the first metallic coating (see 8) and the second metallic coating (see 8') preferably has a thickness at least about one-sixteenth of a gap that exists between the engaged internal female threading 6 and the external male threading 3 when the pin 2 and the box 5 are coupled together without the sealing substance 8, 8'. Most preferably, each of the first and second metallic coatings (see 8, 8') has substantially the same thickness and is of the same pure metal. Each of the first and second metallic coatings (see 8, 8') may be applied to the threads of the pin 2 and the box 5 by the following conventional methods (though it is not restricted to them): electrochemical, molten metal bath, hot dip coating, spray of molten metal, metallic powder, and vapor deposition.

Although the discussion above focused on the use of a pure metal as the sealing substance 8, 8', one or both of the first and second metallic coatings (see 8, 8') may alternatively be alloys. As used herein, an alloy is a metal having impurities of up to about five percent (5%) by weight. In other words, an alloy is a metal that contains about ninety-five percent (95%)

or more by weight of a single metal and about five percent (5%) or less by weight of impurities. In this context, the single metal is again a metal such as, for example, Copper, Aluminum, Lead, Zinc, Tin and Magnesium. As such, the threads of the pin 2 may have a pure metal coating while the threads of the box 5 may have an alloy coating.

Furthermore, the most preferred first and second metallic coatings (see 8, 8') are able to recover mechanical properties at about room temperature or lower. As used herein, in a material properties context, "room temperature" is understood to be at about 70° F. (21° C.). The ability of these first and second metallic coatings (see 8, 8') to recover mechanical properties results from their having recrystallization temperatures about, preferably below, room temperature. For example, the recrystallization temperature of Zinc is 50° F. (10° C.), and that of each of Tin and Lead is 25° F. (−3.9° C.) As such, these metals remain strain free, or substantially strain free, during physical manipulation thereof, because each of the metals can reform its structure spontaneously at room temperature. Moreover, during the recrystallization stage, metals experience an increase in ductility and a reduction in tensile strength, which are preferred property characteristics of the most preferred first and second metallic coatings (see 8, 8'). As discussed below, the ability of the first and second metallic coatings (see 8, 8') to recover mechanical properties at about room temperature or lower allows for the first and second metallic coatings (see 8, 8') to cold weld to each other without heat treatment.

Most importantly, the first metallic coating (see 8) and the second metallic coating (see 8') of the present invention are selected such that when the female threaded element 5 is threadedly engaged with the male threaded element 2 (i.e., made up), the first metallic coating (see 8) cold welds to the second metallic coating (see 8'). As used herein, the terms "cold weld" and "cold welding" have their ordinary meaning as used in the metals art. One such meaning of "cold weld" and "cold welding", for example, is the forcing together of like or unlike metals at ambient temperature, often in a shearing manner, so that normal oxide surface films are ruptured allowing such intimate metal contact that adhesion takes place. Thus, where the sealing substance 8, 8' is a metallic coating, the threaded connection is sealed by the cold welding of the first metallic coating (see 8) with the second metallic coating (see 8'). This cold welding occurs during and as a result of the action of coupling the coated threads of the pin 2 and the coated threads of the box 5. Since the coupling of the pin 2 and the box 5 preferably occurs at about room temperature, metallic coatings having the above described ability to recrystallize at about room temperature promote more successful cold welding of the metallic coating of the pin 2 with the metallic coating of the box 5.

Through the use of the first metallic coating (see 8) and the second metallic coating (see 8') of the present invention, a sealed threaded connection of radially expandable tubulars may be made up, without the need for other substances, such as thread compounds, between the mating surfaces of the threads of the tubulars (e.g., the pin 2 and the box 5) to effect the seal. Further to the cold welding discussion above, the cold welding process may also be characterized as a mechanism of plastic deformation that makes two surfaces (e.g., the first and second metallic coatings) interpenetrate one another and form a metallic bond between them. In the present invention, this cold welding or "linear friction welding" occurs between two surfaces that bear one against the other with a normal force that produces galling (i.e., the coated threads of the pin 2 bear against the coated threads of the box 5) and supplies the metallic adhesion between the two surfaces (i.e., between the first and second metallic coatings (see 8, 8')). This cold weld additionally acts as a sealing means by forming a single, preferably homogeneous, sealing substance 8, 8' out of the first and second metallic coatings (see 8, 8'), wherein that now single sealing substance 8, 8' remains extended between the external male threading 3 and the internal female threading 6 and adhered to both the external male threading 3 and the internal female threading 6.

Figure 7:
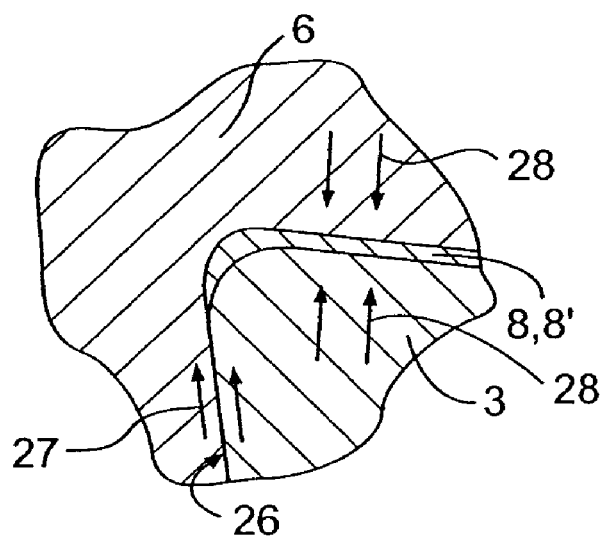
FIG. 7 is a detailed view showing a process by which a sealing substance is distributed or disposed between the threads of male and female threaded elements during make up and during a radial expansion process.

Both the cold welding process and the sealing of the threaded connection using an elastomeric sealant are described in more detail below with reference to FIG. 7. FIG. 7 shows a detail of the threads 3, 6 of the pin 2 and the box 5 as the threaded connection is made up. As shown, one of the external male threads 3 of the pin 2 is in contact with a corresponding internal female thread 6 of the box 5, with the sealing substance 8, 8' already formed (i.e., the sealing substance 8 on the pin 2 has become one with the sealing substance 8' on the box 5) and extended between and adhered to the male and female threading 3, 6. The flow of the sealing substance 8, 8' upon engagement of the pin 2 and the box 5 is shown by means of the arrows 27 along the load flank 26 of the external male thread 3 and corresponding flank of the internal female thread 6. As shown in FIG. 7, the sealing substance 8, 8' is being accumulated in the gap formed between the external male threading 3 and the internal female threading 6. The radially compressive effect, shown by arrows 28, that the sealing substance 8, 8' is subjected to during the make up or after a radial expansion of the made up threaded connection is also shown in FIG. 7, which makes visible the mechanism of cold welding through which sealing of the joint is achieved where the sealing substance 8, 8' is the first and second metallic coatings. Where the sealing substance 8, 8' is the elastomeric sealant, the radial compression produces the appropriate allocation of that elastomeric sealant in the gap(s), and, if the elastomeric sealant is applied on the threads of both the pin 2 and the box 5, the radial compression improves the mixing of the elastomeric sealant (see 8) on the threads 3 of the pin 2 with the elastomeric sealant (see 8') on the threads 6 of the box 5.

The preferred methods of assembling the sealed, radially expandable tubular assembly 1 of the present invention are further described below. In one aspect, the method of forming a sealed tubular joint 1 of the present invention includes providing a first radially expandable tubular member 2 having external male threading 3 and a first free end 4, the external male threading 3 including a first incomplete thread (e.g., 11) and a first hooked thread (e.g., see FIG. 4), the first incomplete thread (e.g., 11) being located at least adjacent the first free end 4 of the first tubular member 2; and providing a second radially expandable tubular member 5 having internal female threading 6 and a second free end 7, the internal female threading 6 including a second incomplete thread (e.g., 12) and a second hooked thread (e.g., see FIG. 4), the second incomplete thread (e.g., 12) being located at least adjacent the second free end 7 of the second tubular member 5.

In a preferred embodiment, the threads 3, 6 of the pin 2 and the box 5 are cleaned. The threads 3, 6 may be cleaned using any number of conventional cleaning methods known, for example, in the oil and gas well drilling fields. Most preferably, the threads 3, 6 of the pin 2 and the box 5 are cleaned to substantially remove all foreign material and surface corrosion. In addition, although not necessary to obtain the sealed, radially expandable tubular assemblies of the present invention, it may be further advantageous to coat the threads 3, 6 of the pin 2 and/or the box 5 with primer material, in order, for example, to improve the adhesion of the sealing substance 8, 8' to the threads 3, 6 or to protect the threads 3, 6 once cleaned.

This primer material is selected based on the particular sealing substance 8, 8' to be applied to the threads 3, 6, such that the primer is compatible with that sealing substance 8, 8' and the material composition of the pin 2 and the box 5.

Thereafter, where the sealing substance 8, 8' is a metallic coating, the preferred method includes coating the external male threading 3 with a first metallic coating (see 8), the first metallic coating being a first pure metal and adhering to the external male threading 3; and coating the internal female threading 6 with a second metallic coating, the second metallic coating being a second pure metal and adhering to the internal female threading 6. The selection of the pure metal(s) to use in this coating application is discussed above with respect to the sealed threaded connection itself. After coating the threads 3, 6, the preferred method includes coupling (i.e., making up) the first tubular member 2 and the second tubular member 5. This coupling process causes the first metallic coating to cold weld to the second metallic coating and vice versa. Furthermore, most preferably, this coupling process includes applying torque to the threaded connection such that the pin nose 9 seats against (i.e., mates with or engages) the internal torque shoulder 30 of the box 5. The amounts of torque to be applied and methods of determining that amount of torque, in order to properly make up a sealed threaded tubular connection, are well known in the oil and gas well drilling fields. Factors that inform the proper amount of torque to apply include, by way of non-limiting example, the size of the tubular members, the amount, size, and type of threading on the tubular members, the particular sealing substance used, the type of tubular member material, and the temperature(s) of the tubular members and sealing substance at the time of make up.

Thereafter, the preferred method includes radially expanding the threaded connection, wherein after this radial expansion of the threaded connection (i) the first metallic coating (see 8) remains adhered to the external male threading 3, (ii) the second metallic coating (see 8') remains adhered to the internal female threading 6, and (iii) the first metallic coating (see 8) and the second metallic coating (see 8') remain cold welded together to effect a seal. The radial expansion process preferably radially expands the threaded connection at least about five percent based on an inside diameter of the threaded connection, more preferably at least about fifteen percent based on an inside diameter of the threaded connection, and most preferably at least about 25 percent based on an inside diameter of the threaded connection. As such, a radially expanded threaded tubular assembly or joint 1 is obtained.

In another preferred method of forming a radially expandable threaded tubular joint 1, where the sealing substance 8, 8' is an elastomeric sealant, the preferred method includes coating at least one of (and most preferably both of) the external male threading 3 and the internal female threading 6 with an elastomeric sealant (see 8, 8'). The selection of the elastomeric sealant(s) (see 8, 8') to use in this coating application is discussed above with respect to the sealed threaded connection itself. This elastomeric sealant(s) (see 8, 8') may be applied to the threads using conventional sealant application processes, which are well known in the oil and gas well drilling fields. The preferred elastomeric sealant(s) (see 8, 8'), as discussed above, adhere to the threads 3, 6 of the pin 2 and the box 5. After coating the threads 3, 6, the preferred method includes coupling (i.e., making up) the first tubular member 2 and the second tubular member 5 before the elastomeric sealant (see 8, 8') has fully cured. This coupling action disposes the elastomeric sealant (see 8, 8') between the external male threading 3 and the internal female threading 6 (see, e.g., FIG. 7), and more particularly, within the gaps between the threads of the coupled threaded connection.

Thereafter, the preferred method includes curing the elastomeric sealant (see 8, 8'). The curing process provides a cured elastomeric sealant extended between and adhered to the external male threading 3 and the internal female threading 6. After curing, the preferred method includes radially expanding the threaded connection, wherein after this radial expansion of the threaded connection the elastomeric sealant (see 8, 8') remains extended between and adhered to the external male threading 3 and the internal female threading 6. The radial expansion process preferably radially expands the threaded connection at least about five percent based on an inside diameter of the threaded connection, more preferably at least about fifteen percent based on an inside diameter of the threaded connection, and most preferably at least about 25 percent based on an inside diameter of the threaded connection. As such, a radially expanded threaded tubular assembly or joint 1 is obtained.

Figure 10:
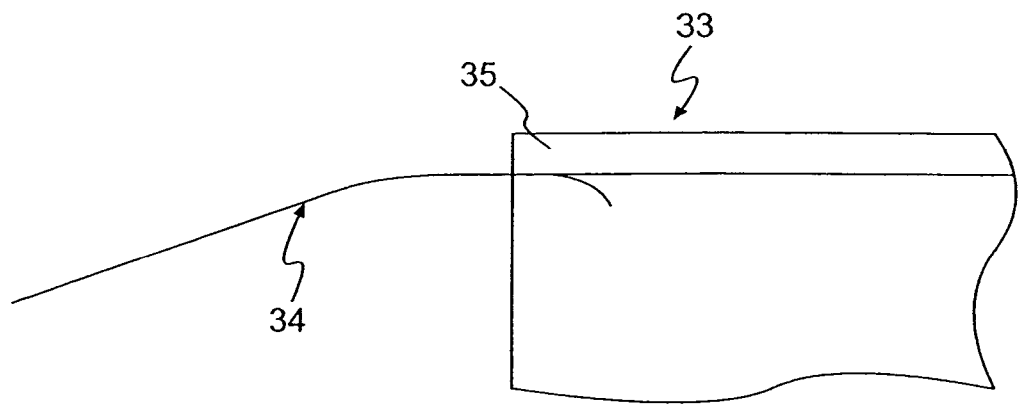
FIG. 10 schematically shows a radial expansion process taking place on a plain end pipe.
Figure 11:
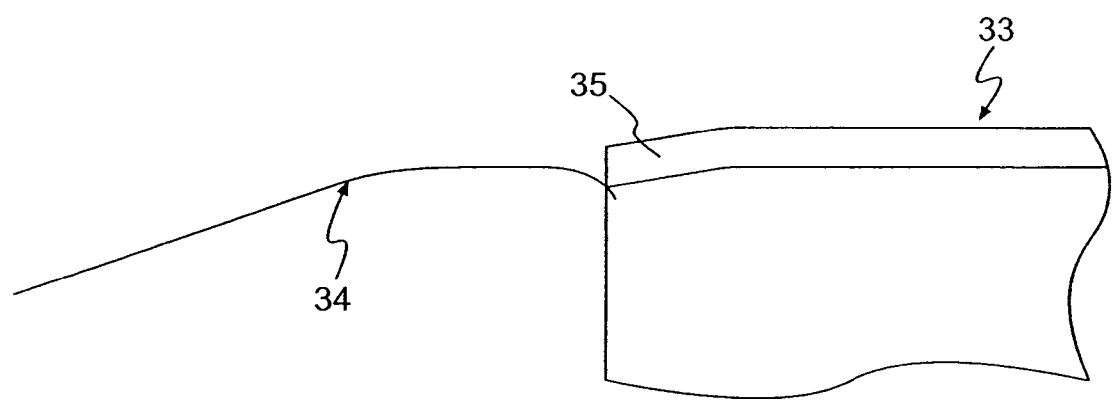
FIG. 11 schematically shows a spring back movement at a free end of a plain end pipe as a mandrel is removed from within the plain end pipe.

FIG. 10 generally shows schematically an expansion process as it is taking place along a plain end pipe 33, which is a pipe without threads. In FIG. 10, a mandrel 34 for use in radially expanding the plain end pipe 33 is moving out of the plain end pipe 33 (to the left in the drawing). FIG. 11 illustrates a "spring-back" movement at the free end 35 of the plain end pipe 33 as the mandrel 34 is removed from within that pipe 33. As a result of the spring-back movement, the free end 35 of the plain end pipe 33 has a smaller inner diameter than the inner diameter of a portion of the pipe 33 further up from that free end 35.

Figure 12:
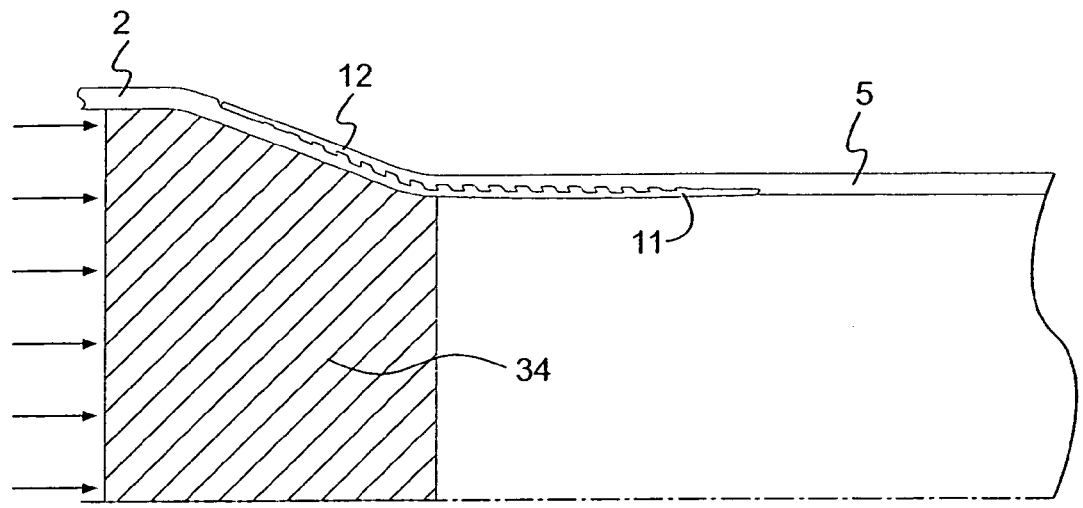
FIG. 12 is a partial cross-sectional view showing an initial stage of deformation produced in a radially expandable threaded connection as a mandrel is pushed through the inside of that threaded connection, and showing threads of the pin and box being deformed.
Figure 13:
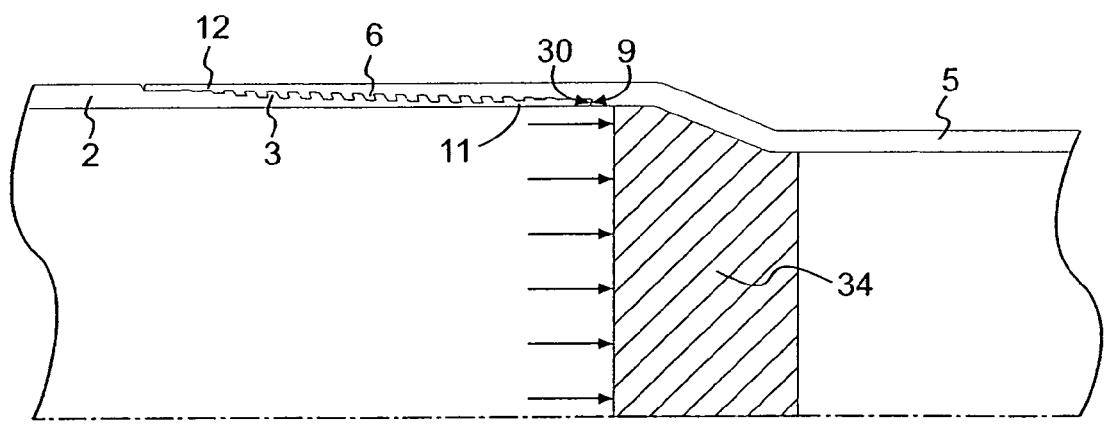
FIG. 13 is a partial cross-sectional view showing a stage of radial expansion of a threaded connection after a mandrel has passed by the threads of a pin and a box.

FIG. 12 shows a made up threaded tubular connection being radially expanded, which is taking place in a direction from the pin 2 to the box 5. As shown in FIG. 12, the mandrel 34 is pushed along the threaded tubular connection to produce such a radial deformation. FIG. 13 shows the threaded tubular connection of FIG. 12 after that threaded tubular connection has been expanded by the mandrel 34. As shown, the mandrel 34 has already passed the threads 3, 6 of the pin 2 and the box 5, and has started expanding the remaining length of the female threaded element 5. FIG. 14 illustrates in more detail an area of the threaded connection once the mandrel 34 has passed beyond the threads of that threaded connection, and particularly shows the pin nose 9 located at the first free end 4 of the pin 2 after radial expansion and the reverse torque shoulder 30. As further illustrated by FIG. 14, it is shown that because of the reverse torque shoulder 30, the pin nose 9 has not suffered deformation towards the inside of the tubular member, i.e., the pin nose 9 has not suffered the "spring-back" effect explained above with reference to FIGS. 10 and 11.

While this invention has been described with reference to what are currently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method of forming a sealed tubular joint, said method comprising the steps of:
   providing a first radially expandable tubular member having external male threading and a first free end, the external male threading including a first incomplete thread and a first hooked thread, the first incomplete thread being located at least adjacent the first free end of the first tubular member;

providing a second radially expandable tubular member having internal female threading and a second free end, the internal female threading including a second incomplete thread and a second hooked thread, the second incomplete thread being located at least adjacent the second free end of the second tubular member;

coating at least one of the external male threading and the internal female threading with a greaseless elastomeric sealant;

coupling the first tubular member and the second tubular member, said coupling thereby providing a threaded connection;

disposing the greaseless elastomeric sealant between the external male threading and the internal female threading and into adherence with each of the external male threading and the internal female threading;

curing the greaseless elastomeric sealant, said curing thereby providing a cured greaseless elastomeric sealant that is extended between and adhered to the external male threading and the internal female threading and has an elastic modulus less than about 2.0 MPa (290 p.s.i); and radially expanding the threaded connection, until the cured greaseless elastomeric sealant is thereby elongated at least about 45 percent while remaining extended between and adhered to the external male threading and the internal female threading.

2. A method according to claim 1, wherein the threaded connection is radially expanded at least about five percent based on an inside diameter of the threaded connection.

3. A method according to claim 1, wherein the threaded connection is radially expanded at least about fifteen percent based on an inside diameter of the threaded connection.

4. A method according to claim 1, wherein the cured greaseless elastomeric sealant (i) is capable of being elongated at least about 400 percent while remaining extended between and adhered to the external male threading and the internal female threading, (ii) is adhered to each of the external male threading and the internal female threading with an adhesion-to-rigid-substrate of at least 0.7 MPa (102 p.s.i.); and (iii) has an elastic modulus between about 0.5 MPa (73 p.s.i.) and about 2.0 MPa (290 p.s.i.).

5. A method according to claim 4, wherein the greaseless elastomeric sealant comprises a viscous paste or a liquid before curing that becomes a rubber-like solid after curing.

6. A method according to claim 1, wherein (i) the threaded connection is a flush joint connection, (ii) each of the first incomplete thread and the second incomplete thread has a perfect crest and an imperfect root, (iii) each of the first incomplete thread and the second incomplete thread is also a hooked thread, (iv) the first incomplete thread is the initial thread adjacent the first free end of the first tubular member and the second incomplete thread is the initial thread adjacent the second free end of the second tubular member, and (v) at least one of the first tubular member and the second tubular member includes a reverse torque shoulder.

7. A method of forming a sealed tubular joint, said method comprising the steps of:

providing a first radially expandable tubular member having external male threading and a first free end, the external male threading including a first incomplete thread and a first hooked thread, the first incomplete thread being located at least adjacent the first free end of the first tubular member;

providing a second radially expandable tubular member having internal female threading and a second free end, the internal female threading including a second incomplete thread and a second hooked thread, the second incomplete thread being located at least adjacent the second free end of the second tubular member;

coating the external male threading with a first metallic coating, the first metallic coating being a first pure metal and adhering to the external male threading;

coating the internal female threading with a second metallic coating, the second metallic coating being a second pure metal and adhering to the internal female threading;

coupling the first tubular member and the second tubular member, said coupling thereby providing a threaded connection, said coupling cold welding the first metallic coating together with the second metallic coating; and radially expanding the threaded connection, wherein after said radial expansion of the threaded connection (i) the first metallic coating remains adhered to the external male threading, (ii) the second metallic coating remains adhered to the internal female threading, and (iii) the first metallic coating and the second metallic coating remain cold welded together.

8. A method according to claim 7, wherein the threaded connection is radially expanded at least about five percent based on an inside diameter of the threaded connection.

9. A method according to claim 7, wherein the threaded connection is radially expanded at least about fifteen percent based on an inside diameter of the threaded connection.

10. A method according to claim 7, wherein (i) each of the first pure metal and the second pure metal contains 99.99 percent by weight of a single metal selected from the group consisting of Copper, Aluminum, Lead, Zinc, Tin and Magnesium, (ii) the threaded connection is a flush joint connection, (iii) each of the first incomplete thread and the second incomplete thread has a perfect crest and an imperfect root, (iv) each of the first incomplete thread and the second incomplete thread is also a hooked thread, and (v) at least one of the first tubular member and the second tubular member includes a reverse torque shoulder.

* * * * *